US011343703B2

United States Patent
Cho et al.

(10) Patent No.: US 11,343,703 B2
(45) Date of Patent: May 24, 2022

(54) METHOD FOR PERFORMING REFLECTIVE QUALITY OF SERVICE IN WIRELESS COMMUNICATION SYSTEM AND A DEVICE THEREFOR

(71) Applicant: LG Electronics Inc., Seoul (KR)

(72) Inventors: Heejeong Cho, Seoul (KR); Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 184 days.

(21) Appl. No.: 16/630,100

(22) PCT Filed: Sep. 18, 2018

(86) PCT No.: PCT/KR2018/010959
§ 371 (c)(1),
(2) Date: Jan. 10, 2020

(87) PCT Pub. No.: WO2019/054841
PCT Pub. Date: Mar. 21, 2019

(65) Prior Publication Data
US 2020/0154304 A1 May 14, 2020

Related U.S. Application Data

(60) Provisional application No. 62/559,675, filed on Sep. 18, 2017.

(51) Int. Cl.
*H04W 28/02* (2009.01)
(52) U.S. Cl.
CPC ... *H04W 28/0268* (2013.01); *H04W 28/0289* (2013.01)

(58) Field of Classification Search
None
See application file for complete search history.

(56) References Cited

U.S. PATENT DOCUMENTS 9,717,016 B2    7/2017    Zeng et al.
2011/0267943 A1   11/2011    Huang et al.
(Continued)

FOREIGN PATENT DOCUMENTS

KR    10-2017-0086622 A    7/2017

OTHER PUBLICATIONS

MediaTek, SDAP header design for reflective QoS indication and QoS flow remapping (Year: 2017).*
(Continued)

*Primary Examiner* — Ayanah S George
(74) *Attorney, Agent, or Firm* — Dentons US LLP

(57) ABSTRACT

The present invention relates to a wireless communication system. More specifically, the present invention relates to a method and a device for performing reflective Quality of Service (QoS) in wireless communication system, the method comprising: receiving a DL PDU with a QoS flow ID via a DL DRB identified by a first DRB ID from a network; determining whether or not to update UL QoS flow to DRB mapping rule according to a value of the QoS flow ID; and transmitting UL data via a UL DRB mapped to QoS flow ID of the UL data based on the UL QoS flow to DRB mapping rule, wherein if the QoS flow ID is not a specific value but a first QoS flow ID, the UL QoS flow to DRB mapping rule is updated such that a UL DRB mapped to the first QoS flow ID is changed to a UL DRB identified by the first DRB ID, and wherein if the QoS flow ID is the specific value, the UE doesn't update the UL QoS flow to DRB mapping rule.

10 Claims, 15 Drawing Sheets

(56) References Cited

U.S. PATENT DOCUMENTS

2018/0083688 A1* 3/2018 Agiwal ............... H04B 7/0697
2018/0270697 A1* 9/2018 Turtinen ........... H04W 72/1242
2020/0187044 A1* 6/2020 Jiang .................... H04W 76/20

OTHER PUBLICATIONS

RP-171985: 3GPP TS 37 324 V1.0.0. (Sep. 2017) 3rd Generation Partnership Project; Technical Specification Group Radio Access Network; E-UTRA and NR; Service Data Adaption Protocol (SDAP) specification (release 15) Valbonne, France (15 pages).
R2-1708260: 3GPP TSG RAN WG2 Meeting #99, Berlin, Germany, Aug. 21-25, 2017; Media Tek Inc. "SDAP header design for reflective QoS indication and QoS flow remapping," (7 pages).
RP-171985: 3GPP TSG RAN Meeting #77, Sapporo, Japan, Sep. 11-14, 2017, "Presentation of Specification/Report to TSG," TS 37.324, Version 1.0.0, RAN2, (1 Page).

* cited by examiner

[Figure 1]
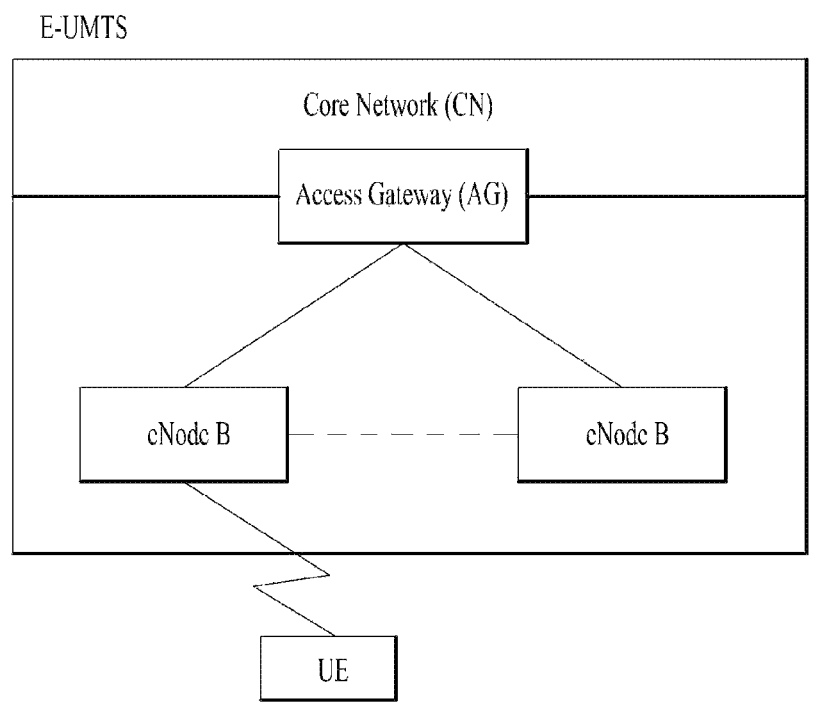

[Figure 2a]
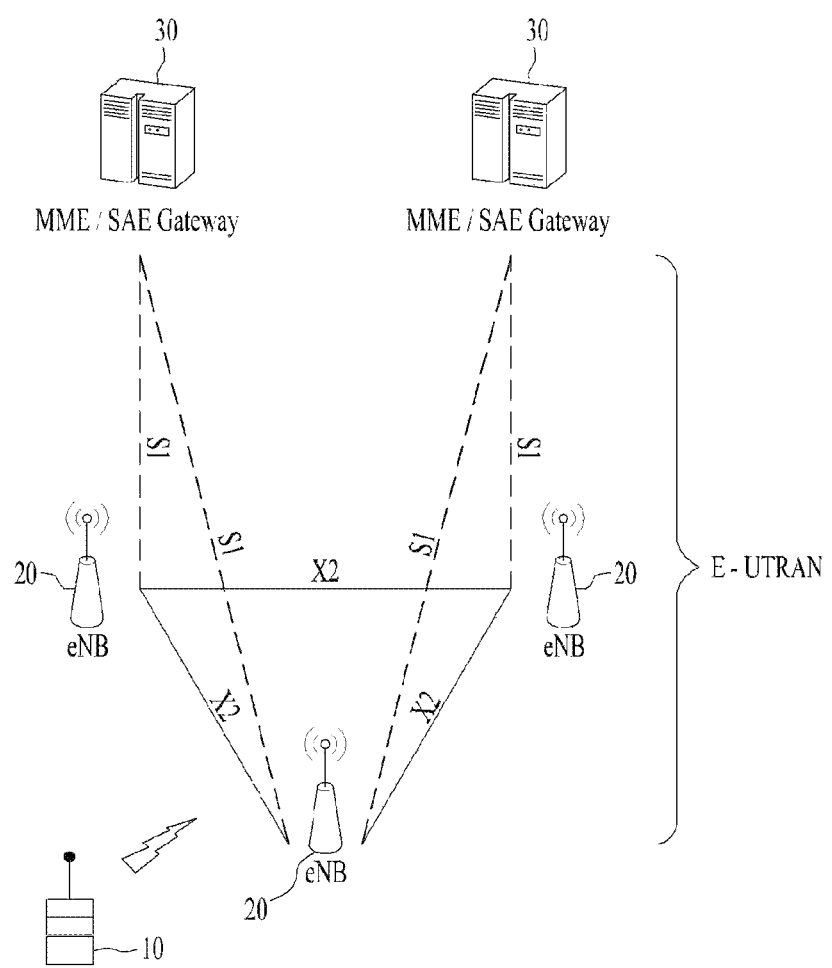

[Figure 2b]
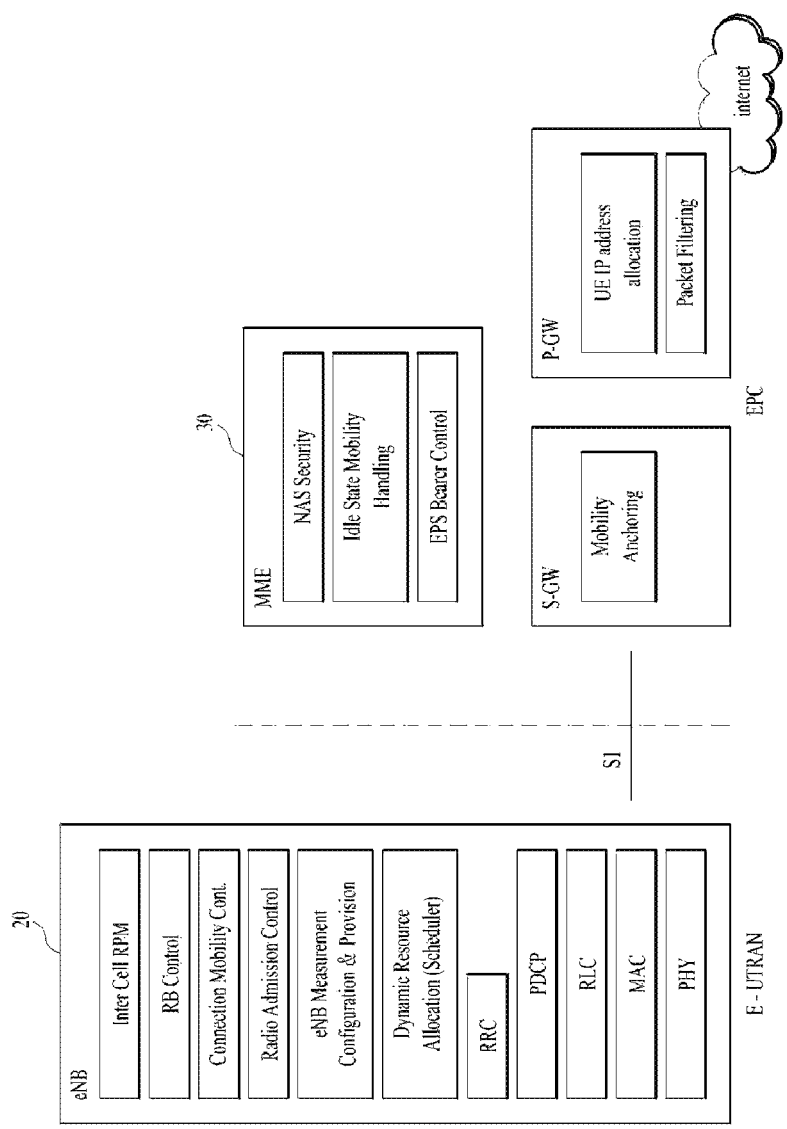

[Figure 3]
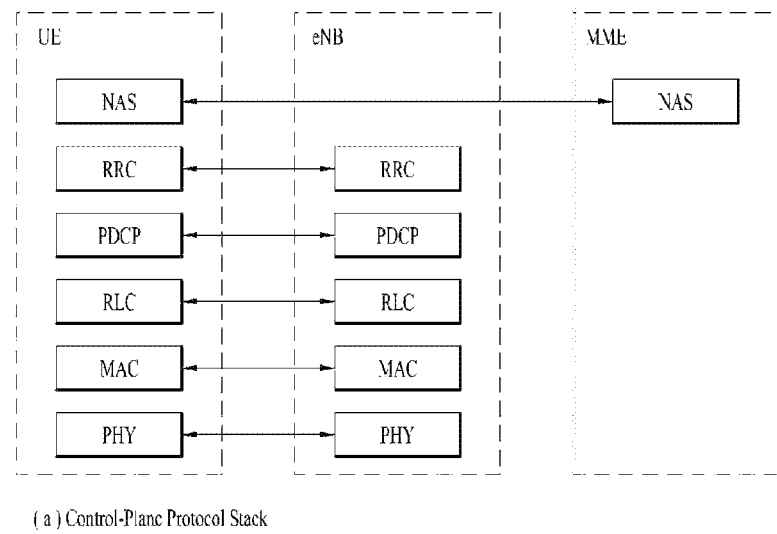
( a ) Control-Plane Protocol Stack
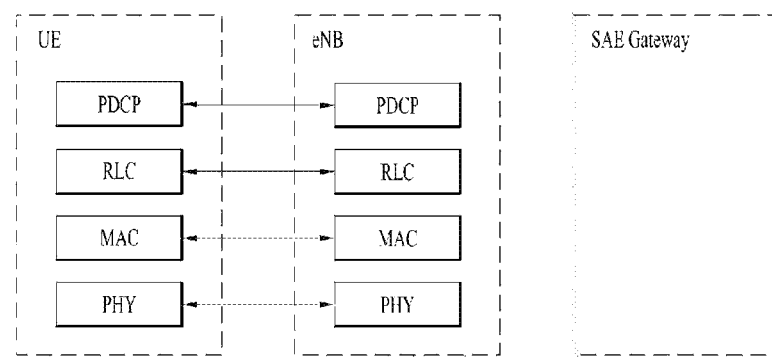
( b ) User-Plane Protocol Stack

[Figure 4a]
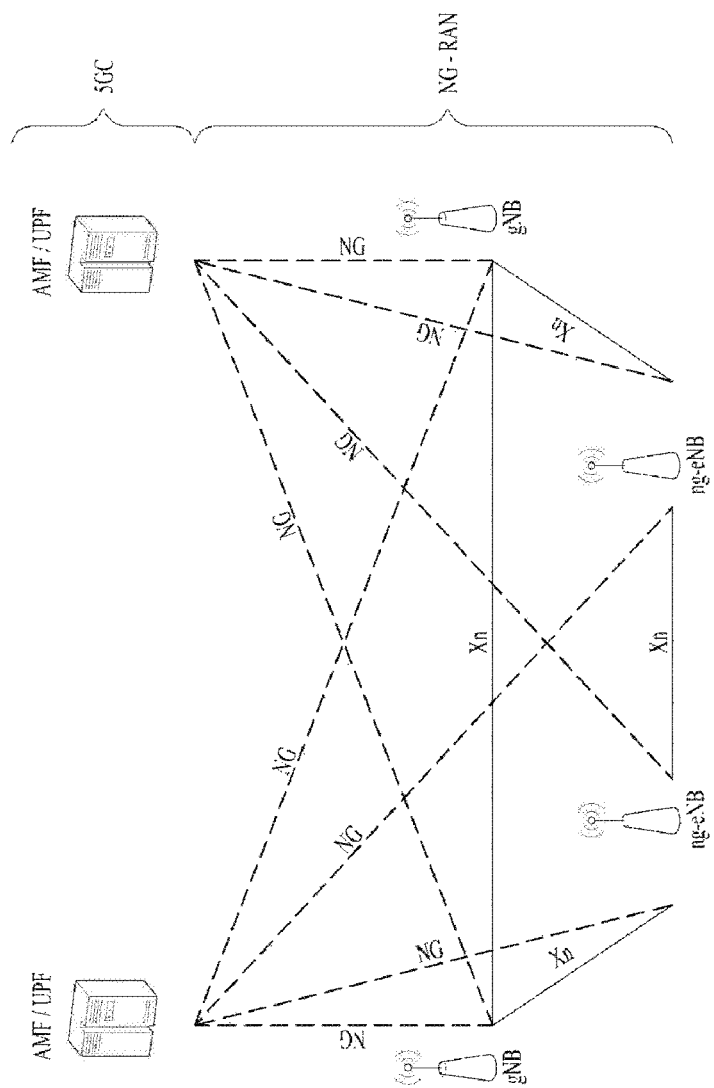

[Figure 4b]
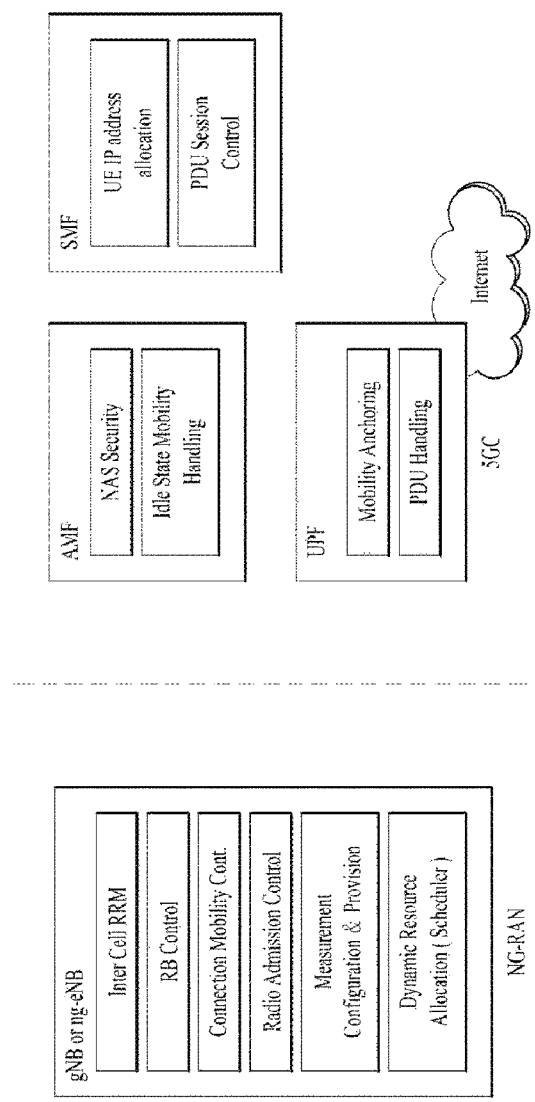

[Figure 5]
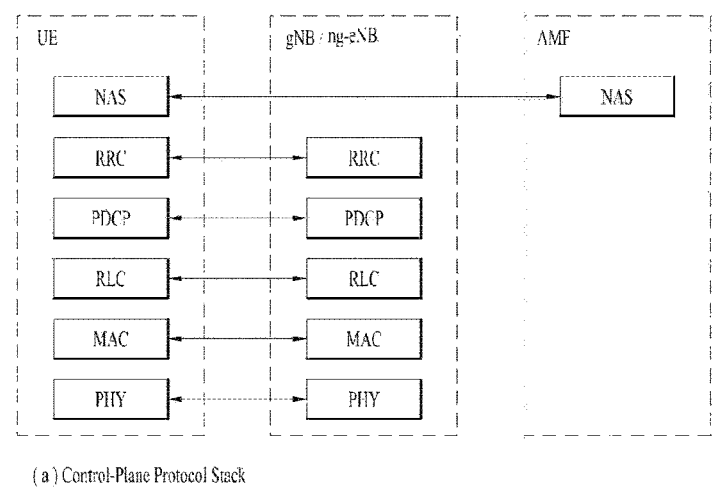
(a) Control-Plane Protocol Stack
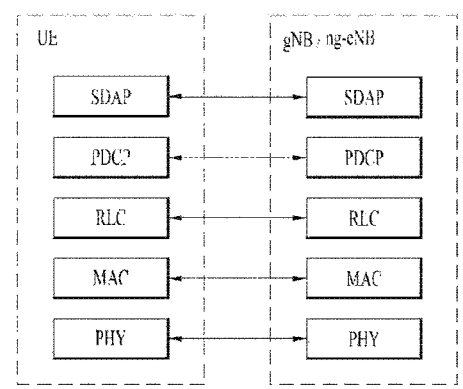
(b) User-Plane Protocol Stack

[Figure 6]
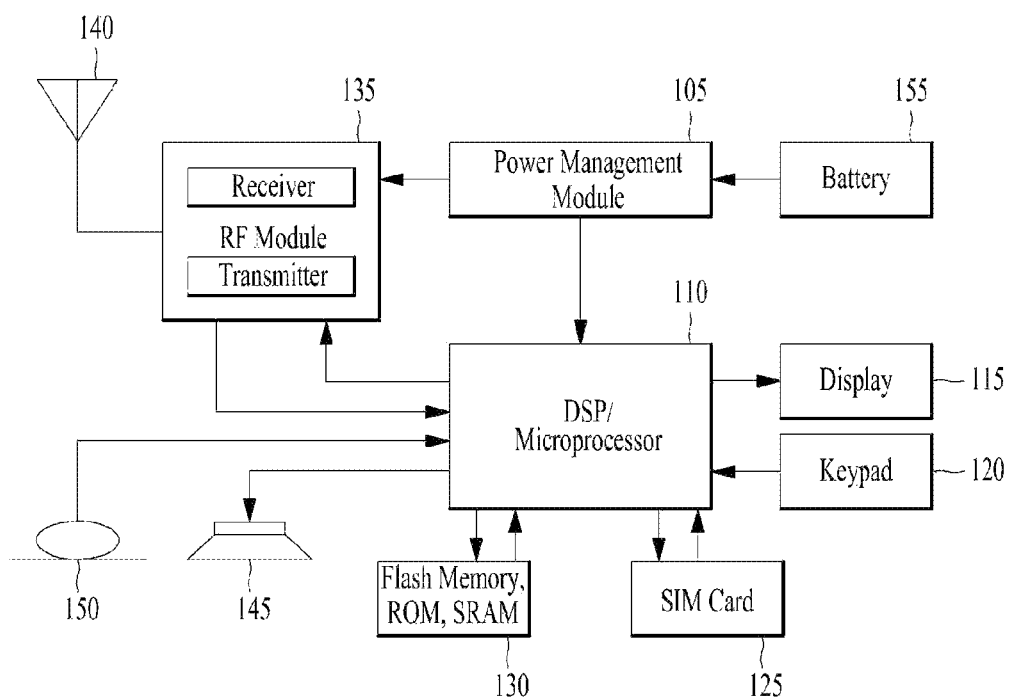

【Figure 7】
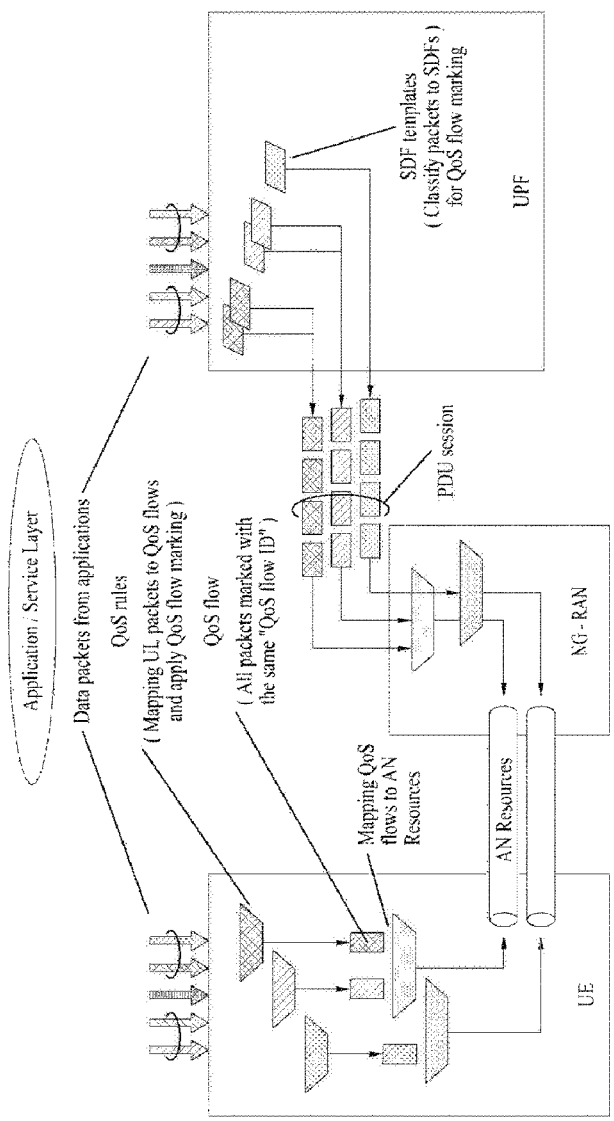

[Figure 8]
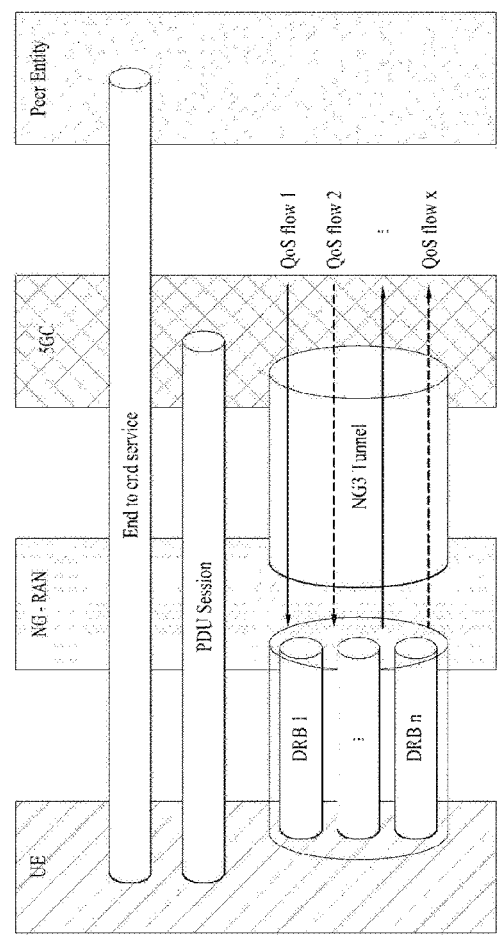

【Figure 9】
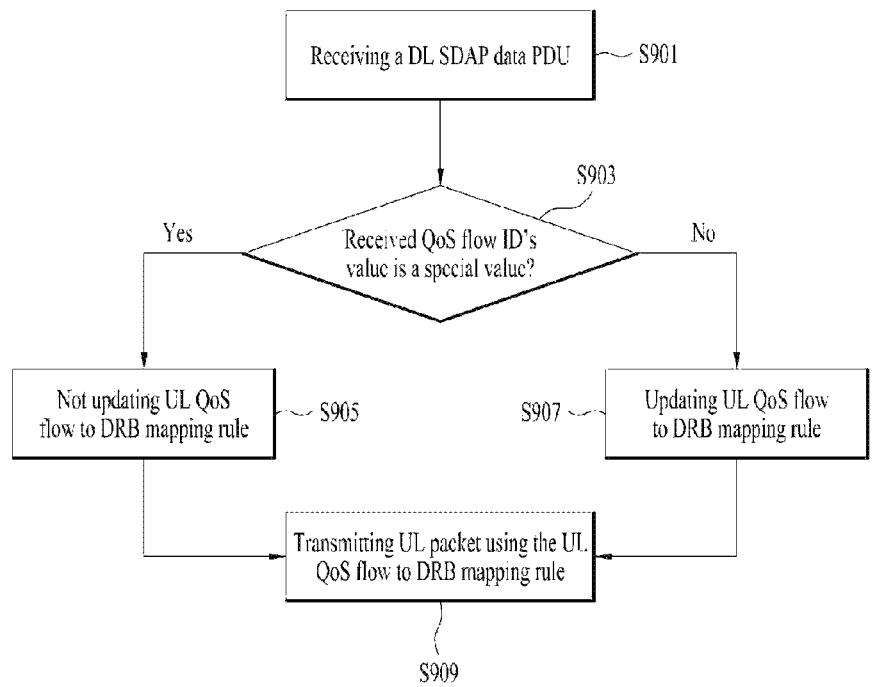
【Figure 10】
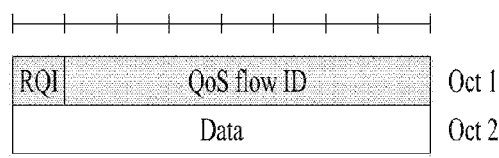

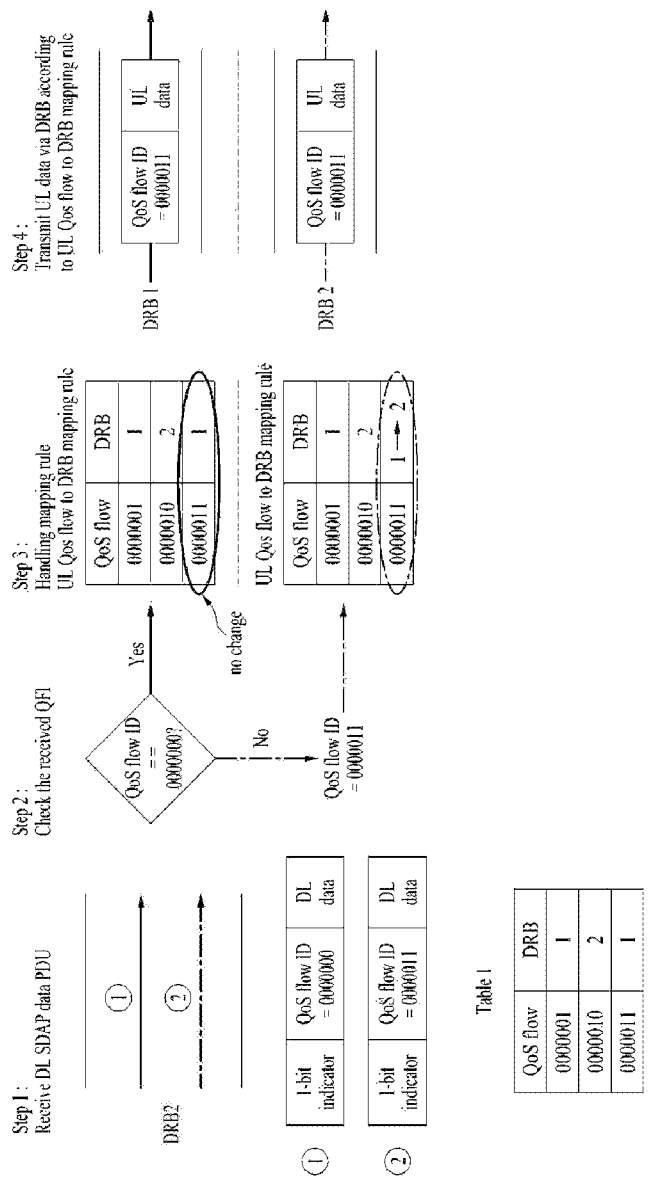
[Figure 11]

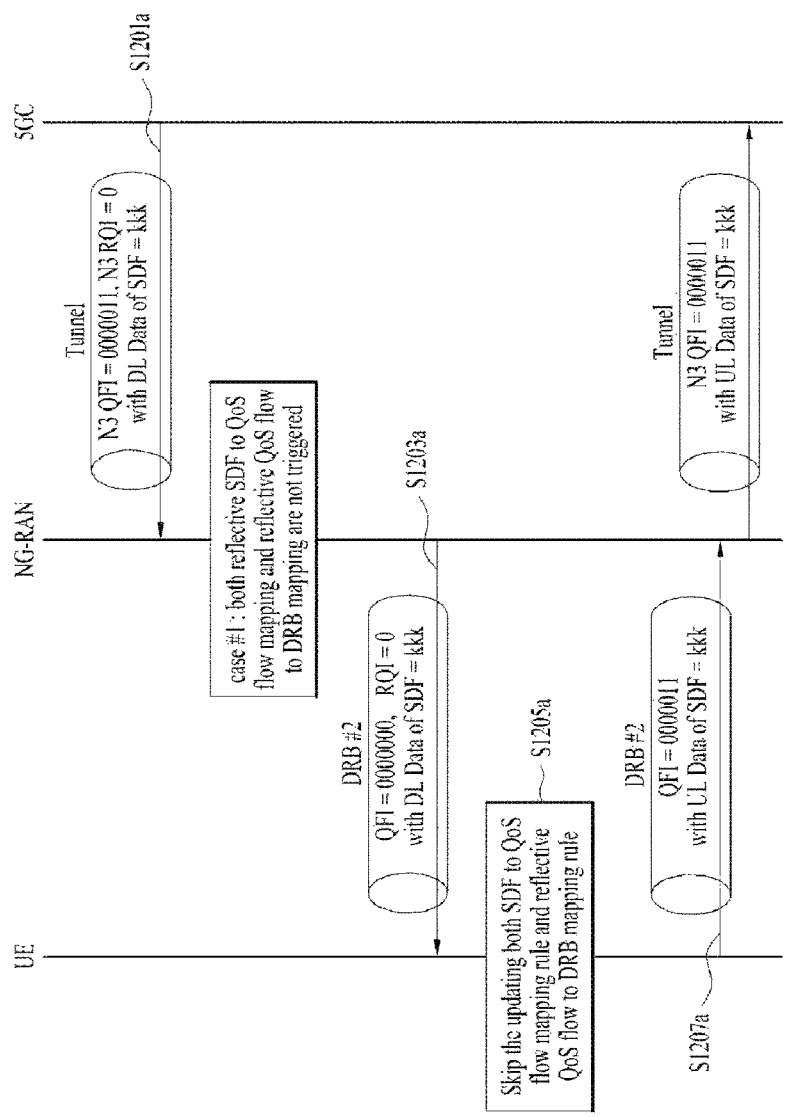
[Figure 12a]

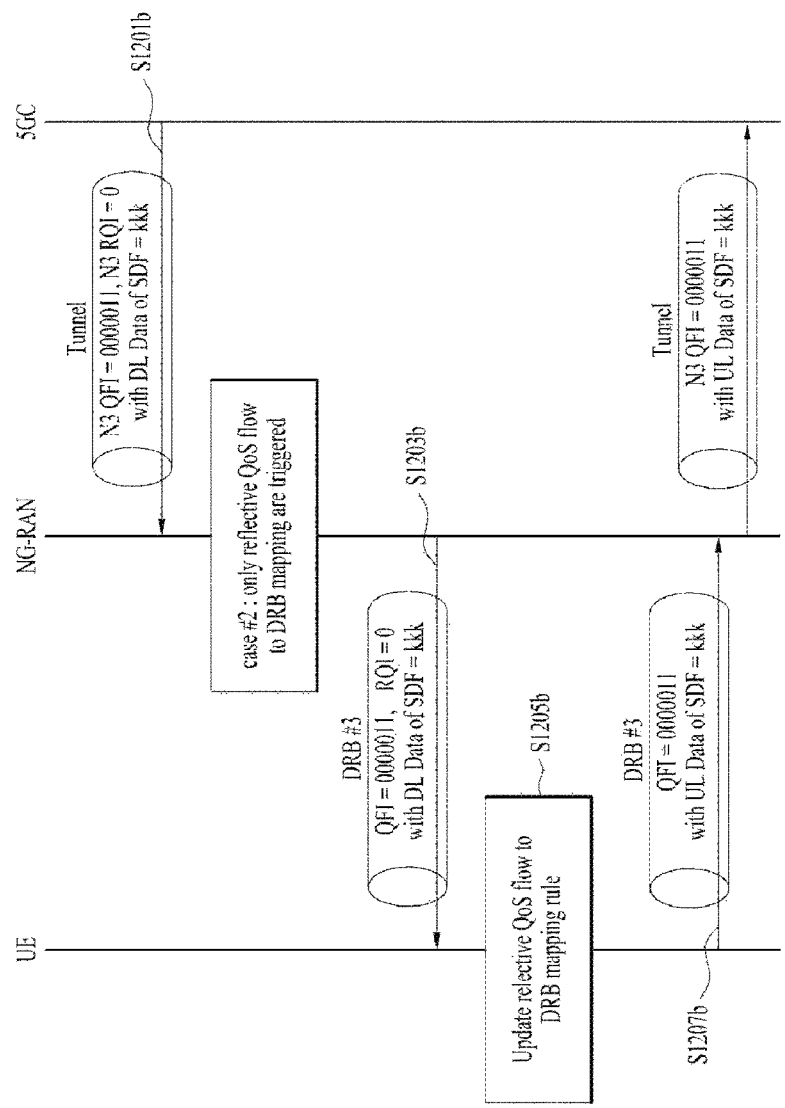
[Figure 12b]

【Figure 12c】
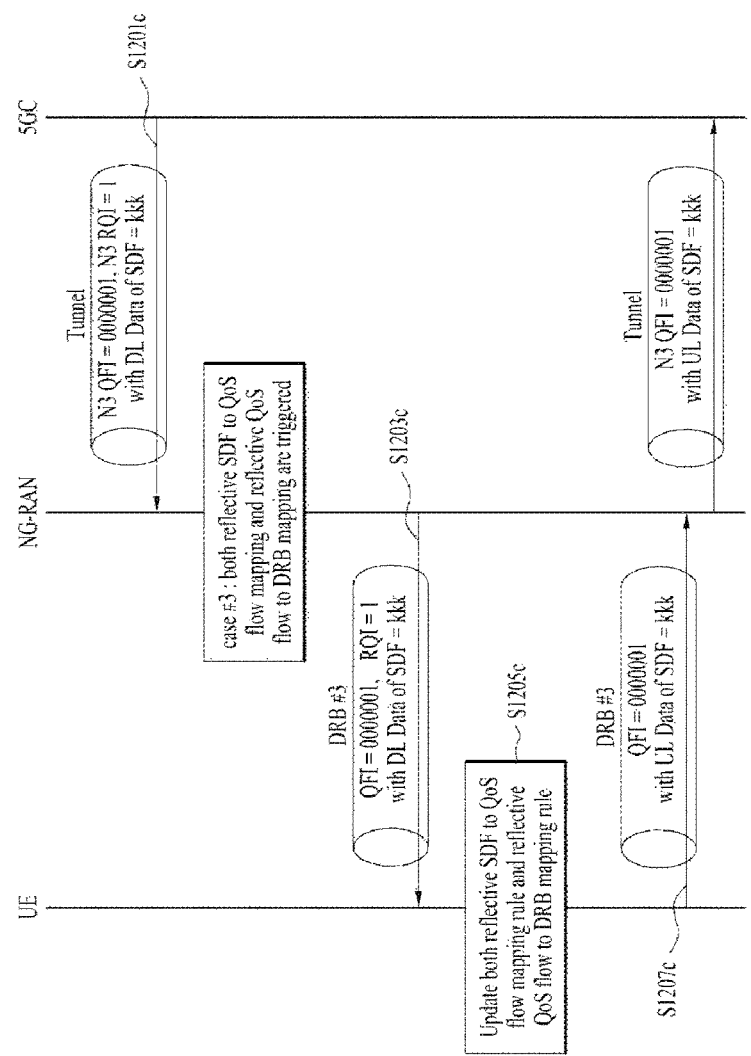

METHOD FOR PERFORMING REFLECTIVE QUALITY OF SERVICE IN WIRELESS COMMUNICATION SYSTEM AND A DEVICE THEREFOR

This application is a National Stage Entry of International Application No. PCT/KR2018/010959 filed Sep. 18, 2018, which claims the benefit of U.S. Provisional Application No. 62/559,675 filed Sep. 18, 2017, all of which are hereby incorporated by reference in their entirety for all purposes as if fully set forth herein.

TECHNICAL FIELD

The present invention relates to a wireless communication system and, more particularly, to a method for performing reflective Quality of Service (QoS) in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

DISCLOSURE

Technical Problem

An object of the present invention devised to solve the problem lies in a method and device for performing reflective Quality of Service (QoS) in wireless communication system.

QoS flow ID marking in DL packet is needed for reflective QoS. There are two types of reflective QoS: i) reflective QoS flow to DRB mapping and ii) reflective SDF to QoS flow mapping. In other words, the reflective QoS flow to DRB mapping is to update the UL QoS flow to DRB mapping rule in the UE based on QoS flow ID in the DL packet received within a DRB, whereas reflective SDF to QoS flow mapping is to update the UL SDF to QoS flow mapping rule (e.g., packet filter) in the UE based on the DL packet and the QoS flow ID.

Because NAS is responsible for the SDF to QoS flow mapping, reflective SDF to QoS flow mapping is triggered by 5G Core Network (5GC). According to the TS 23.501, per packet N3 indication (N3 RQI) for reflective SDF to QoS flow mapping is carried in encapsulation header on N3 from 5GC to NG-RAN. So, NG-RAN can know whether reflective SDF to QoS flow mapping is triggered by 5GC. Reflective QoS flow to DRB mapping is triggered by NG-RAN because AS is responsible for the QoS flow to DRB mapping.

Each separate indicator is required for indicating whether reflective QoS flow to DRB mapping or/and reflective SDF to QoS flow mapping has been triggered. However, only one of the indicators may be able to be included in DL packet depending on a size of the QoS flow ID (e.g., more than 6-bit) and a size of DL SDAP header (e.g., 8-bit). In that case, the UE does not know which types of the reflective QoS is (are) triggered. That is, the UE can't be sure which UL mapping rule(s) such as UL SDF to QoS flow mapping rule and UL QoS flow to DRB mapping rule should be updated. In order to solve this problem, UE has to know which mapping rule(s), which is UL QoS flow to DRB mapping rule and UL SDF to QoS flow mapping rule, to be updated.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

In this invention, this invention proposes a scheme for handling reflective QoS flow to DRB mapping when a UE receives from NG-RAN a DL SDAP data PDU including QoS flow ID.

Especially when a size of the QoS flow ID is more than 6-bit, a size of DL SDAP header is fixed (e.g., 8-bit), and a size of the reflective indicator is 1-bit, the present invention can be usefully used.

In particular, when the indicator with 1-bit included in the DL SDAP header of the SDAP data PDU indicates whether NAS should be informed of the updated of SDF to QoS flow mapping rules (i.e. RQI), the present invention can be usefully used.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2a is a block diagram illustrating network structure of an evolved universal mobile telecommunication system (E-UMTS), and FIG. 2b is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4a is a block diagram illustrating network structure of NG Radio Access Network (NG-RAN) architecture, and FIG. 4b is a block diagram depicting architecture of functional Split between NG-RAN and 5G Core Network (5GC);

FIG. 5 is a diagram showing a control plane and a user plane of a radio interface protocol between a UE and a NG-RAN based on a 3rd generation partnership project (3GPP) radio access network standard;

FIG. 6 is a block diagram of a communication apparatus according to an embodiment of the present invention;

FIG. 7 is a diagram for classification and user plane marking for QoS flows and mapping to NG-RAN resources;

FIG. 8 is a conceptual diagram for 5G QoS model;

FIG. 9 is a conceptual diagram for performing reflective QoS flow to DRB mapping in wireless communication system according to embodiments of the present invention;

FIG. 10 is an example for format of DL SDAP data PDU with DL SDAP header according to embodiments of the present invention;

FIG. 11 is an example for performing reflective QoS flow to DRB mapping in wireless communication system according to embodiments of the present invention; and FIG. 12 is example for performing reflective Quality of Service (QoS) in wireless communication system according to embodiments of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (HDD) scheme in the present specification, the embodiments of the present invention may be easily modified and applied to a half-duplex FDD (H-FDD) scheme or a time division duplex (TDD) scheme.

FIG. 2a is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2a, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2*b* is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4a is a block diagram illustrating network structure of NG Radio Access Network (NG-RAN) architecture, and FIG. 4b is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

FIG. 6 is a block diagram of a communication apparatus according to an embodiment of the present invention.

The apparatus shown in FIG. 6 can be a user equipment (UE) and/or eNB or gNB adapted to perform the above mechanism, but it can be any apparatus for performing the same operation.

As shown in FIG. 6, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 6 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 6 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 7 is a diagram for classification and user plane marking for QoS flows and mapping to NG-RAN resources.

The 5G QoS model is based on QoS flows. The 5G QoS model supports both QoS flows that require guaranteed flow bit rate (GBR QoS flows) and QoS flows that do not require guaranteed flow bit rate (non-GBR QoS flows). The 5G QoS model also supports reflective QoS.

The QoS flow is the finest granularity of QoS differentiation in the PDU session. A QoS Flow ID (QFI) is used to identify a QoS flow in the 5G System. User plane traffic with the same QFI within a PDU Session receives the same traffic forwarding treatment (e.g. scheduling, admission threshold). The QFI is carried in an encapsulation header on N3 (and N9) i.e. without any changes to the e2e packet header. QFI shall be used for all PDU session types. The QFI shall be unique within a PDU session. The QFI may be dynamically assigned or may be equal to the 5QI.

Within the 5G System, a QoS flow is controlled by the SMF and may be preconfigured, or established via the PDU Session Establishment procedure, or the PDU Session Modification procedures.

Any QoS flow is characterized by: i) a QoS profile provided by the SMF to the NG-RAN via the AMF over the N2 reference point or preconfigured in the NG-RAN, ii) one or more QoS rule(s) which can be provided by the SMF to the UE via the AMF over the N1 reference point and/or derived by the UE by applying reflective QoS control, and iii) one or more SDF templates provided by the SMF to the UPF.

The UE performs the classification and marking of UL user plane traffic, i.e. the association of UL traffic to QoS flows, based on QoS rules. These QoS rules may be explicitly provided to the UE (using the PDU Session Establishment/Modification procedure), pre-configured in the UE or implicitly derived by UE by applying reflective QoS.

The principle for classification and marking of user plane traffic and mapping of QoS flows to NG-RAN resources is illustrated in FIG. 7.

In DL, incoming data packets are classified by the UPF based on SDF templates according to their SDF precedence, (without initiating additional N4 signaling). The UPF conveys the classification of the user plane traffic belonging to a QoS flow through an N3 (and N9) user plane marking using a QFI. The NG-RAN binds QoS flows to NG-RAN resources (i.e. Data Radio Bearers). There is no strict 1:1 relation between QoS flows and NG-RAN resources. It is up to the NG-RAN to establish the necessary NG-RAN resources that QoS flows can be mapped to.

In UL, the UE evaluates UL packets against the packet filter set in the QoS rules based on the precedence value of QoS rules in increasing order until a matching QoS rule (i.e. whose packet filter matches the UL packet) is found. The UE uses the QFI in the corresponding matching QoS rule to bind the UL packet to a QoS flow.

FIG. 8 is a conceptual diagram for 5G QoS model.

As shown in the FIG. 8, multiple user plane traffics (e.g., IP flow) can be multiplexed onto the same QoS flow and multiple QoS flows can be multiplexed onto the same DRB (Data Radio Bearer). In DL, 5GC is responsible for the SDF to QoS flow mapping and NG-RAN is responsible for the QoS flow to DRB mapping. In UL, the UE performs a 2-step mapping of SDFs, in which NAS is responsible for the SDF to QoS flow mapping, and AS is responsible for the QoS flow to DRB mapping. In other words, the UE maps an SDF to a QoS flow according to the QoS rules such as default QoS rule, pre-authorised QoS rule and/or reflective QoS rule which 5GC provides to the UE. And then, the UE maps the QoS flow to a DRB according to the QoS flow to DRB mapping rules which the NG-RAN provides to the UE.

QoS flow ID marking in DL packet is needed for reflective QoS. There are two types of reflective QoS: i) reflective QoS flow to DRB (or AS) mapping rule and ii) reflective SDF to QoS flow (or NAS) mapping rule. In other words, the reflective QoS flow to DRB mapping is to update the UL QoS flow to DRB mapping rule in the UE based on QoS flow ID in the DL packet received within a DRB, whereas reflective SDF to QoS flow mapping is to update the UL SDF to QoS flow mapping rule (e.g., packet filter) in the UE based on the DL packet and the QoS flow ID.

Because NAS is responsible for the SDF to QoS flow mapping, reflective SDF to QoS flow mapping is triggered by 5G Core Network (5GC). According to the TS 23.501, per packet N3 indication (N3 RQI) for reflective SDF to QoS flow mapping is carried in encapsulation header on N3 from 5GC to NG-RAN. So, NG-RAN can know whether reflective SDF to QoS flow mapping is triggered by 5GC. Reflective QoS flow to DRB mapping is triggered by NG-RAN because AS is responsible for the QoS flow to DRB mapping.

Two types of reflective QoS can be triggered independently, as the following cases: i) CASE #1: Both reflective SDF to QoS flow mapping and reflective QoS flow to DRB mapping are triggered, ii) CASE #2: Both reflective SDF to QoS flow mapping and reflective QoS flow to DRB mapping are not triggered, iii) CASE #3: Only reflective SDF to QoS flow mapping is triggered, and iv) CASE #4: Only reflective QoS flow to DRB mapping is triggered.

Meanwhile, in case that reflective QoS flow to DRB mapping and reflective SDF to QoS flow mapping are performed separately based on a respective indicator, there is no problem because all four cases can be distinguished.

However, only one of the indicators may be able to be included in DL SDAP header if a size of the QoS flow ID is more than 6-bit, and a size of the DL SDAP header is fixed (e.g., 8-bit). In that case, the UE does not know which types of the reflective QoS is (are) triggered. That is, the UE can't be sure which UL mapping rule(s) such as reflective QoS flow to DRB mapping rule or reflective SDF to QoS flow mapping rule should be updated.

For example, the 1-bit indicator is set to '0' only in CASE #2, but to '1' in the other cases. QoS Flow ID is set to a value determined depending on the QoS Flow identity carried in encapsulation header on N3 from 5GC to NG-RAN.

When the UE receives a DL data packet with 1-bit indicator set to '1', the UE updates both UL QoS flow to DRB mapping rule and UL SDF to QoS flow mapping rule. The updating operation may be performed even if reflective SDF to QoS flow mapping is not triggered by 5GC. It means that UL SDF to QoS flow mapping rule is updated in different against the 5GC's intention. This problem can happen when NG-RAN triggers reflective QoS flow to DRB mapping in order to control the mapping of QoS Flows to DRB in the following situations which is irrelevant to NAS: i) when the gNB receives the DL packet of the exiting QoS flow for which the gNB doesn't provide the UE with a QoS flow to DRB mapping rule or ii) when the gNB decides to change the QoS flow to DRB mapping rule due to RAN load and RRM policy.

In order to solve this problem, the UE has to know which rule(s), which is reflective QoS flow to DRB mapping rule and reflective SDF to QoS flow mapping rule, to be updated.

FIG. 9 is a conceptual diagram for performing reflective QoS flow to DRB mapping in wireless communication system according to embodiments of the present invention.

Some terms of this invention are defined as the followings:

PDU Session refers to association between the UE and a data network that provides a PDU connectivity service which is a service that provides exchange of PDU (Packet Data Units) between a UE and a data network.

QoS rule refers to a set of information enabling the detection of a service data flow (e.g., IP flow) and defining its associated QoS parameters. It consists of NAS-level QoS profile (e.g., QoS characteristics, QoS marking) and Packet filters. Three types of QoS rule are Default QoS Rule, Pre-authorised QoS rule and Reflective QoS rule.

In here, the Default QoS Rule is a mandatory QoS rule per PDU Session. It is provided at PDU Session establishment to UE, and the Pre-authorised QoS rule is any QoS rule (different from the Default QoS rule) provided at PDU Session establishment, and Reflective QoS rule is the QoS rule which is created by UE based on QoS rule applied on the DL traffic.

N3 RQI indicates that a downlink packet is subject to reflective SDF to QoS flow mapping, and is provided on N3 (NG-U) on per-packet basis.

QoS marking refers to a scalar that is used as a reference to a specific packet forwarding behaviour.

Packet filter to information for matching service data flows. The format of the packet filters is a pattern for matching the IP 5 tuple (source IP address or IPv6 network prefix, destination IP address or IPv6 network prefix, source port number, destination port number, protocol ID of the protocol above IP). Service data flows are mapped to a QoS flow according to DL/UL packet filter.

QoS Flow refers to finest granularity for QoS treatment.

NG (Next Generation) system consists of AMF (Access and Mobility Management Function), SMF (Session Management Function) and UPF (User plane Function).

AS mapping rule refers to UL QoS flow to DRB mapping rule configured to the UE.

As-level reflective QoS refers to updating the UL QoS flow to DRB mapping rule in the UE based on the DL packet with QoS flow ID received within a DRB. A UE monitors the QoS flow to DRB mapping relationship in the DL, and applies it to in the UL.

N3 refers to reference point for the user plane between NG-RAN and 5GC.

SDAP refers to Service Data Adaptation Protocol which is a user plane AS protocol layer for the flow based QoS framework and a higher layer than a Packet Data Convergence Protocol (PDCP) entity of the UE.

This invention proposes a scheme for updating UL QoS flow to DRB mapping rule when a UE receives from NG-RAN a DL SDAP data PDU with a QoS flow ID. It is proposed that a special value of QoS flow ID indicates whether or not the UE should keep the current UL QoS flow to DRB mapping rule which has been used for transmission of UL data from the UE to the NG-RAN.

In detail, when the UE receives a DL SDAP Protocol Data Unit (PDU) with a QoS flow ID via a DL DRB identified by a first DRB ID from a network (S901), the UE checks whether the received QoS flow ID's value is same as a special value which is pre-defined, or configured by network (S903).

Preferably, the special value is pre-defined in the specification. For example it can be, e.g., all '0' (0000000) or all '1' (1111111), or it can be a specific QoS flow ID that does not identify other QoS flows.

Preferably, the special value is configured by the network. That is, it can be transmitted to the UE during the procedure (s) of RRC connection (re)configuration, SDAP entity (re) configuration or DRB (re)configuration.

If the received QoS flow ID's value is same as a special value, the UE doesn't update the UL QoS flow to DRB mapping rule (S905). That is, the UE keeps using the currently existing UL QoS flow to DRB mapping rule. It means that the UE keeps using a same DRB for transmission of UL data for a QoS flow as before.

Preferably, the special value can be configured per PDU session, SDAP entity, or UE.

For all QoS flows of the PDU session or the SDAP entity to which the DRB, over which the DL SDAP data PDU is received, belongs, the UL QoS flow to DRB mapping rule is unchanged, and the UE keeps transmitting a UL data for a QoS flow via the DRB mapped to the QoS flow according to the currently existing UL QoS flow to DRB mapping rule.

For all QoS flow(s) of the UE, the UL QoS flow to DRB mapping rule is unchanged, and for all of the QoS flows of the UE, the UE keeps transmitting a UL data for a QoS flow via the DRB mapped to the QoS flow according to the currently existing UL QoS flow to DRB mapping rule.

If the received QoS flow ID's value is not a special value (i.e., a value is a QoS flow identity), the UE updates QoS flow to DRB mapping rule for the QoS flow indicated by the received QoS flow ID (S907). To be more concrete, the indicated QoS flow is newly associated with a DRB via which the DL SDAP data PDU has been received. That is, if a DL SDAP data PDU with a QoS flow ID #1 (is not a special value) via a DL DRB identified by a first DRB ID, the UL QoS flow to DRB mapping rule is updated such that a UL DRB mapped to the QoS flow ID #1 is changed to a UL DRB identified by the first DRB ID.

When the UE transmits UL packet, the UE uses the UL QoS flow to DRB mapping rule (S909).

When UL data is received from an upper layer, the UE transmits the UL packet to the NG-RAN via the DRB defined by the unchanged UL QoS flow to DRB mapping rule. In other words, the UE transmits the UL data to the NG-RAN via the same DRB as before, in a case that the UE doesn't update the UL QoS flow to DRB mapping rule according to the step of S905.

Meanwhile, when UL data is received from an upper layer, the UE transmits the UL packet to the NG-RAN via the DRB defined by the UL QoS flow to DRB mapping rule.

In detail, if the UL packet is of the indicated QoS flow, the UE transmits the UL packet to the NG-RAN via the newly associated DRB where the DL SDAP data PDU has been received in a case that the UE updates QoS flow to DRB mapping rule for the QoS flow indicated by the received QoS flow ID according to the step of S907.

FIG. 10 is an example for format of DL SDAP data PDU with DL SDAP header according to embodiments of the present invention.

The header of the DL SDAP data PDU includes an indicator indicating whether NAS should be informed of updated of SDF to QoS flow mapping rules for UL (e.g. RQI).

Preferably, a size of the indicator is 1-bit.

If the indicator indicates to perform reflective SDF to QoS flow mapping for UL (i.e., RQI is set to 1), the UE updates the SDF to QoS flow mapping rule for UL such that a UL QoS flow ID, mapped to a UL SDF ID associated with a first SDF ID of the DL SDAP data PDU, is changed to the QoS flow ID of DL SDAP data PDU.

If the indicator indicates not to perform reflective SDF to QoS flow mapping for UL (i.e., RQI is set to 0), the UE doesn't updates the SDF to QoS flow mapping rule for UL.

FIG. 11 is an example for performing reflective QoS flow to DRB mapping in wireless communication system according to embodiments of the present invention.

Examples of the UE behavior for updating UL QoS flow to DRB mapping rule are shown in FIG. 11. In these examples, we assume that special value is '0000000'. There are two DL SDAP data PDUs that the first is a DL SDAP data PDU including QoS flow ID set to '0000000', and the second is a DL SDAP data PDU including QoS flow ID set to a value other than '0000000', e.g., '0000011' (step 1).

And the UE has a UL QoS flow to DRB mapping rule received from a network (Table 1).

When receiving the first DL SDAP data PDU, the UE checks whether the received QoS flow ID's value is same as a special value (step 2).

Because the received QoS flow ID's value is '0000000', the UE keeps using the currently existing UL QoS flow to DRB mapping rule (step 3). If the UE receives a UL data for QoS flow '0000011' from an upper layer, the UE transmits the UL data to 5G-RAN via the DRB 1 defined by the unchanged UL QoS flow to DRB mapping rule (step 4).

When receiving the second DL SDAP data PDU, because the received QoS flow ID's value is not '0000000', the UE updates UL QoS flow to DRB mapping rule for the received QoS flow '0000011' (step 3). In other words, the UE changes the QoS flow's DRB from '1' to '2' based on the received QoS flow '0000011', and DRB 2 which the DL SDAP data PDU has been received within. If the UE receives a UL data for QoS flow '0000011' from an upper layer, the UE transmits the UL data to 5G-RAN via the DRB 2 defined by the updated UL QoS flow to DRB mapping rule (step 4).

FIG. 12 is an example for performing reflective Quality of Service (QoS) in wireless communication system according to embodiments of the present invention.

Example for both reflective SDF to QoS flow mapping and reflective QoS flow to DRB mapping is shown in FIG. 12. In this example, we assume that special value is '0000000'. Also, 1-bit indicator can be named RQI or NRQI. QoS flow ID can be named QFI.

The existing UL SDF to QoS flow mapping rule is Table A and the existing UL QoS flow to DRB mapping rule is Table B.

TABLE A

| SDF | QoS flow |
|---|---|
| xxx | 0000001 |
| kkk | 0000011 |
| zzz | 0000010 |

TABLE B

| QoS flow | DRB |
|---|---|
| 0000001 | 1 |
| 0000011 | 2 |
| 0000010 | 3 |

There are three cases that the first case is when both reflective SDF to QoS flow mapping and reflective QoS flow to DRB mapping are not triggered (FIG. 12*a*), the second case is when only reflective QoS flow to DRB mapping is triggered (FIG. 12*b*), and the third case is when both reflective SDF to QoS flow mapping and reflective QoS flow to DRB mapping are triggered (FIG. 12*c*).

In the first case (FIG. 12*a*), the NG-RAN receives a DL data from the 5GC (S1201*a*). If NG-RAN is aware that both reflective SDF to QoS flow mapping and reflective QoS flow to DRB mapping are not triggered, NG-RAN sets NRQI to '0' and QoS Flow ID to '0000000' in the SDAP header, respectively. The NG-RAN sends the DL data with the SDAP header (DL SDAP data PDU) to the UE through the DRB #2 (S1203*a*). If the UE receives the DL SDAP data PDU, the UE skips the updating of both UL QoS flow to DRB mapping rule and UL SDF to QoS flow mapping rule because the received QoS flow ID's value is '0000000' and NRQI's value is '0' (S1205*a*). And then, if receiving a UL data from an upper layer, the UE maps the UL data with SDF=kkk to QoS Flow '0000011' defined by the unchanged SDF to QoS flow mapping rule according to Table A. The UE transmits the UL data associated with QoS Flow ID=0000011 to the NG-RAN via the DRB 2 defined by the unchanged UL QoS flow to DRB mapping rule according to Table B (S1207*a*).

In the second case (FIG. 12*b*), the NG-RAN receives another DL data from the 5GC (S1201*b*). If NG-RAN is aware that reflective SDF to QoS flow mapping is not triggered, NG-RAN sets NRQI to '0'. If the NG-RAN decides to trigger reflective QoS flow to DRB mapping, QoS Flow ID is set to '0000011' determined depending on the QoS Flow value carried in encapsulation header on N3 from 5GC to NG-RAN. The NG-RAN sends the DL SDAP data PDU to the UE through the DRB #3 (S1203*b*). If the UE receives the DL SDAP data PDU, the UE updates only UL QoS flow to DRB mapping rule because the received QoS flow ID's value is not '0000000' but NRQI's value is '0' (S1205*b*).

The UE updates the UL QoS flow to DRB mapping rule such that a DRB mapped to the QoS flow ID=0000011 (i.e. DRB2) is changed to a DRB where the DL SDAP data PDU has been received (i.e. DRB 3) as Table C.

TABLE C

| QoS flow | DRB |
|---|---|
| 0000001 | 1 |
| 0000011 | 2 → 3 |
| 0000010 | 3 |

And then, if receiving a UL data from an upper layer, the UE maps the UL data with SDF=kkk to QoS Flow '0000011' defined by the unchanged SDF to QoS flow mapping rule according to Table A. The UE transmits the UL data associated with QoS Flow ID=0000011 to the NG-RAN via the DRB 3 defined by the updated UL QoS flow to DRB mapping rule according to Table C (S1207b).

In the third case (FIG. 12c), the NG-RAN receives another DL data from the 5GC (S1201c). If the NG-RAN is aware that reflective SDF to QoS flow mapping is triggered, NG-RAN sets NRQI to '1' and sets QoS Flow ID to '0000001' determined depending on the QoS Flow value carried in encapsulation header on N3 from 5GC to NG-RAN. At that time, the NG-RAN can decide to trigger reflective QoS flow to DRB mapping. In the third case, the NG-RAN triggers reflective QoS flow to DRB mapping. The NG-RAN sends the DL SDAP data PDU to the UE through the DRB #3 (S1203c). If the UE receives the DL SDAP data PDU, the UE updates both UL SDF to QoS flow mapping rule and UL QoS flow to DRB mapping rule because the received QoS flow ID's value is not '0000000' and NRQI's value is '1' (S1205c).

The UE updates the UL SDF to QoS flow mapping rule such that QoS flow ID mapped to SDF=kkk (i.e. 0000011) is changed to QoS flow ID=0000001 like Table D, and the UE updates the UL QoS flow to DRB mapping rule such that a DRB mapped to the QoS flow ID=0000001 (i.e. DRB1) is changed to a DRB where the DL SDAP data PDU has been received (i.e. DRB 3) as Table E.

TABLE D

| SDF | QoS flow |
| --- | --- |
| xxx | 0000001 |
| kkk | 0000011 → 0000001 |
| zzz | 0000010 |

TABLE E

| QoS flow | DRB |
| --- | --- |
| 0000001 | 1 → 3 |
| 0000011 | 2 |
| 0000010 | 3 |

And then, if receiving a UL data with SDF=kkk from an upper layer, the UE maps the UL data with kkk to QoS Flow '0000001' defined by the changed SDF to QoS flow mapping rule. The UE transmits the UL data associated with the '0000001' to the NG-RAN via the DRB 3 defined by the updated UL QoS flow to DRB mapping rule (S1207c).

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NRsystem.

The invention claimed is:

1. A method for a User Equipment (UE) operating in a wireless communication system, the method comprising:
    receiving, by a processor operably coupled with a transceiver, a downlink (DL) Protocol Data Unit (PDU) with a Quality of Service (QoS) flow identifier (ID) via a DL data radio bearer (DRB) identified by a first Data Radio Bearer (DRB) identifier (ID) from a network;
    determining, by the processor, whether or not to update an uplink (UL) QoS flow to DRB mapping rule according to a value of the QoS flow ID; and
    transmitting, by the processor, UL data via a UL DRB mapped to QoS flow ID of the UL data based on the UL QoS flow to DRB mapping rule,
    wherein based on the QoS flow ID not being a specific value but a first QoS flow ID, the UL QoS flow to DRB mapping rule is updated by the processor, such that a UL DRB mapped to the first QoS flow ID is changed to a UL DRB identified by the first DRB ID, wherein based on the QoS flow ID being the specific value, the processor doesn't update the UL QoS flow to DRB mapping rule, wherein a header of the DL PDU includes an indicator indicating whether NAS should be informed of an update of Service Data Flow (SDF) to QoS flow mapping rules for UL, and wherein based on the indicator indicating usage of the SDF to QoS flow mapping rule for UL, the processor updates the SDF to QoS flow mapping rule for UL such that a UL QoS flow ID, mapped to a UL SDF ID associated with a first SDF ID of the DL PDU, is changed to the QoS flow ID of DL PDU.

2. The method according to claim 1, wherein based on the processor updating the UL QoS flow to DRB mapping rule, such that the UL DRB mapped to the first QoS flow ID is changed to a UL DRB identified by the first DRB ID, the processor transmits the UL data identified by the first QoS flow ID via the UL DRB identified by the first DRB ID according to the updated UL QoS flow to DRB mapping rule.

3. The method according to claim 1, wherein the UL QoS flow to DRB mapping rule is a mapping rule that determines which DRB packets of the QoS flow should carry UL data.

4. The method according to claim 1, wherein the specific value is configured per PDU session, Service Data Adaptation Protocol (SDAP) entity, or UE.

5. The method according to claim 1, wherein the DL PDU is a DL Service Data Adaptation Protocol (SDAP) PDU for a SDAP entity which is a higher layer than a Packet Data Convergence Protocol (PDCP) entity of the UE.

6. A User Equipment (UE) for operating in a wireless communication system, the UE comprising:

a transceiver; and a processor operably coupled with the transceiver and configured to:

receive a downlink (DL) Protocol Data Unit (PDU) with a QoS flow ID via a DL data radio bearer (DRB) identified by a first DRB identifier (ID) from a network, determine whether or not to update an UL QoS flow to DRB mapping rule according to a value of the QoS flow ID, and transmit uplink (UL) data via a UL DRB mapped to QoS flow ID of the UL data based on the UL QoS flow to DRB mapping rule, wherein based on the QoS flow ID not being a specific value but a first QoS flow ID, the UL QoS flow to DRB mapping rule is updated such that a UL DRB mapped to the first QoS flow ID is changed to a UL DRB identified by the first DRB ID, wherein based on the QoS flow ID being the specific value, the processor doesn't update the UL QoS flow to DRB mapping rule, wherein a header of the DL PDU includes an indicator indicating whether NAS should be informed of an update of Service Data Flow (SDF) to QoS flow mapping rules for UL, and wherein based on the indicator indicating usage of the SDF to QoS flow mapping rule for UL, the processor updates the SDF to QoS flow mapping rule for UL such that a UL QoS flow ID, mapped to a UL SDF ID associated with a first SDF ID of the DL PDU, is changed to the QoS flow ID of DL PDU.

7. The UE according to claim 6, wherein based on the processor updating the UL QoS flow to DRB mapping rule, such that the UL DRB mapped to the first QoS flow ID is changed to a UL DRB identified by the first DRB ID, the processor transmits the UL data identified by the first QoS flow ID via the UL DRB identified by the first DRB ID according to the updated UL QoS flow to DRB mapping rule.

8. The UE according to claim 6, wherein the UL QoS flow to DRB mapping rule is a mapping rule that determines which DRB packets of the QoS flow should carry UL data.

9. The UE according to claim 6, wherein the specific value is configured per PDU session, Service Data Adaptation Protocol (SDAP) entity, or UE.

10. The UE according to claim 6, wherein the DL PDU is a DL Service Data Adaptation Protocol (SDAP) PDU for a SDAP entity which is a higher layer than a Packet Data Convergence Protocol (PDCP) entity of the UE.

* * * * *